United States Patent
Münning et al.

(10) Patent No.: US 12,291,210 B2
(45) Date of Patent: May 6, 2025

(54) METHOD FOR CARRYING OUT A LANE CHANGE ON A DECELERATION LANE BY MEANS OF AN ASSISTANCE SYSTEM, COMPUTER PROGRAM PRODUCT, AND ASSISTANCE SYSTEM

(71) Applicant: Volkswagen Aktiengesellschaft, Wolfsburg (DE)

(72) Inventors: Daniel Münning, Braunschweig (DE); Stefan Detering, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 267 days.

(21) Appl. No.: 17/849,388

(22) Filed: Jun. 24, 2022

(65) Prior Publication Data

US 2022/0410902 A1 Dec. 29, 2022

(30) Foreign Application Priority Data

Jun. 28, 2021 (DE) .......................... 102021206694.1

(51) Int. Cl.
*B60W 40/04* (2006.01)
*B60W 30/18* (2012.01)
(Continued)

(52) U.S. Cl.
CPC ...... *B60W 30/18163* (2013.01); *B60W 40/04* (2013.01); *B60W 40/105* (2013.01);
(Continued)

(58) Field of Classification Search
CPC ....... B60W 30/18163; B60W 50/0097; B60W 50/10; B60W 50/14; B60W 2554/408;
(Continued)

(56) References Cited

U.S. PATENT DOCUMENTS

2003/0204299 A1 10/2003 Waldis et al.
2016/0258764 A1* 9/2016 Phuyal ................ G08G 1/0104
(Continued)

FOREIGN PATENT DOCUMENTS

| DE | 102016216135 A1 | 3/2018 |
|----|-----------------|--------|
| DE | 102017212172 A1 | 1/2019 |
| DE | 102019213599 A1 | 8/2020 |

OTHER PUBLICATIONS

DE Application No. 102021206694.1. Examination Report (Apr. 5, 2022).

(Continued)

*Primary Examiner* — Kenneth J Malkowski
(74) *Attorney, Agent, or Firm* — Peter Zura; LOZA & LOZA, LLP

(57) ABSTRACT

Technologies and techniques for carrying out an assisted lane change onto a deceleration lane, during which an intervention in an acceleration device may be carried out in an at least partially assisted manner as a function of a driver input on a driving lane of the roadway. The lane change from the driving lane onto the deceleration lane may be carried out in an at least partially assisted manner, wherein swarm data are received from at least one further motor vehicle, which carried out a lane change onto the deceleration lane at a crossing, and a change position for the lane change of the motor vehicle is determined as a function of the received crossing position. The lane change is carried out at the determined change position. Other aspects relate to a computer program product and to an assistance system.

20 Claims, 2 Drawing Sheets

(51) Int. Cl.
*B60W 40/105* (2012.01)
*B60W 50/00* (2006.01)
*B60W 50/10* (2012.01)
*B60W 50/14* (2020.01)

(52) U.S. Cl.
CPC ........ *B60W 50/0097* (2013.01); *B60W 50/10* (2013.01); *B60W 50/14* (2013.01); *B60W 2050/0005* (2013.01); *B60W 2050/146* (2013.01); *B60W 2554/408* (2020.02); *B60W 2555/20* (2020.02); *B60W 2556/10* (2020.02); *B60W 2556/50* (2020.02); *B60W 2556/65* (2020.02)

(58) Field of Classification Search
CPC ......... B60W 2555/20; B60W 2556/10; B60W 2556/50
See application file for complete search history.

(56) References Cited

U.S. PATENT DOCUMENTS

| | | |
|---|---|---|
| 2017/0076607 A1 | 3/2017 | Linder et al. |
| 2019/0152525 A1* | 5/2019 | Resch ................... G01C 21/34 |
| 2020/0189598 A1 | 6/2020 | Eigel et al. |
| 2024/0101116 A1* | 3/2024 | Totzke ............ B60W 30/18145 |

OTHER PUBLICATIONS

Rotter. "Swarm Behaviour for Path Planning." Freie Universität Berlin, Intelligent Systems Working Group Robotics, Master's Degree in Computer Science (May 12, 2014).

* cited by examiner

METHOD FOR CARRYING OUT A LANE CHANGE ON A DECELERATION LANE BY MEANS OF AN ASSISTANCE SYSTEM, COMPUTER PROGRAM PRODUCT, AND ASSISTANCE SYSTEM

RELATED APPLICATIONS

The present application claims priority to German Patent App. No. 10 2021 206 694.1, to Münning et al., filed Jun. 28, 2021, the contents of which is incorporated by reference in its entirety herein.

TECHNICAL FIELD

The present disclosure relates to technologies and techniques for carrying out a lane change onto a deceleration lane of a roadway by means of an assistance system of a motor vehicle operated in an at least partially assisted manner. An intervention in an acceleration device of the assistance system may be carried out in an at least partially assisted manner as a function of a driver input on a lane change actuating device of the assistance system on a driving lane of the roadway. The lane change from the driving lane onto the deceleration lane may be carried out in an at least partially assisted manner. The present disclosure furthermore relates to a computer program product and to an assistance system.

BACKGROUND

Motor vehicles that can be operated in an at least partially assisted manner ("semi-autonomous") are already known from the prior art. A driver performs the driving task in the motor vehicle, wherein corresponding movements can be carried out in an at least partially assisted manner by an assistance system. Lane change assistance systems are already known for this purpose, in which a lane change can be carried out in an at least partially assisted manner by the driver actuating a lane change actuating device, for example a turn signal device. The lane change assistance system can in particular be provided on highways or rural roads that include multiple driving lanes, for example. In the case of highways, or in the case of rural roads including multiple lanes, furthermore so-called exit ramps or deceleration lanes are known, on which the motor vehicle can, in turn, accordingly leave the highway or the rural road. In this way, the driver or the motor vehicle must likewise activate a turn signal so as to indicate to the participating traffic that the motor vehicle desires to exit. In particular, however, on highways or rural roads, a distinction must be made between a lane change onto the corresponding normal driving lanes or onto the exit ramps or deceleration lanes.

However, the driver again activates the turn signal when exiting, or when exiting onto the deceleration lane, wherein it is often generally not yet allowed at this moment to change onto the deceleration lane since the lane marking next to the motor vehicle is still a solid line, and the shoulder is situated next to the motor vehicle. The lane change according to the prior art, as it is to be carried out when changing onto another driving lane, for example, thus cannot be applied to the deceleration lane.

US 2003/204299 A1 describes a control system for a motor vehicle, such as, for example, an adaptive cruise control system, comprising a navigation system. The navigation system comprises a global positioning system. The navigation system detects a ramp and generates a navigation signal that includes navigation data and map data. A controller is electrically coupled to the navigation system. The controller adjusts the speed of the motor vehicle in response to the navigation signal.

According to US 2017076607 A1, a method is provided for organized intelligent merge notifications. The method includes identifying a merge aperture using a processor. Merge parameters for a vehicle approaching the merge aperture are received over a network. Simulations of traffic moving through the merge aperture are carried out by the processor based on the received parameters of the merging vehicle. The simulations are optimized by the processor to determine a merge distance for the merging vehicle. A merge notification is generated by the processor for the merging vehicle based on the merge distance.

According to US 2020189598 A1, technologies and techniques are shown for automatically preparing and/or executing a possible lane change with an ego vehicle traveling in moving traffic from a first lane to a second lane of a multi-lane roadway by means of a driver assistance system is described. Gaps between two vehicles are detected, and the relative positions and movements of the gaps relative to the ego vehicle facilitate a potential lane change of the ego vehicle. The driver assistance system adjusts the following distance and/or the following speed of the ego vehicle relative to the preceding vehicle in such a way that changing a lane and merging into a gap of an adjacent lane is made possible by means of a transverse guidance of the ego vehicle.

SUMMARY

Aspects of the present disclosure are directed to a method, a computer program product, and an assistance system, by means of which an improved lane change onto a deceleration lane is made possible.

Some aspects include a method, a computer program product, and an assistance system according to the independent claims. Advantageous embodiments are provided in the dependent claims.

In some examples, a method is disclosed for carrying out a lane change onto a deceleration lane of a roadway by means of an assistance system of a motor vehicle operated in an at least partially assisted manner, during which an intervention in an acceleration device of the assistance system is carried out in an at least partially assisted manner as a function of a driver input on a lane change actuating device of the assistance system on a driving lane of the roadway, and a lane change from the driving lane onto the deceleration lane is carried out in an at least partially assisted manner. An associated a computer program product and assistance system are also disclosed.

The present disclosure also encompasses refinements of the assistance system according to the present disclosure of a motor vehicle according to the present disclosure which include features such as those described herein according to the present disclosure. For this reason, the corresponding refinements of the assistance system according to the present disclosure and of the motor vehicle according to the present disclosure are not explicitly described for the purposes of brevity.

The present disclosure furthermore also relates to an assistance system for carrying out a lane change onto a deceleration lane of a roadway, comprising at least one actuating device, comprising an acceleration device, comprising a swarm data receiving device, and comprising an electronic computing device, the assistance system being designed to carry out methods according to the preceding aspect. The method is in particular carried out by means of the assistance system.

An electronic computing device as described herein comprises electronic components, such as processors and integrated circuits, to be able to carry out a corresponding methods.

Still another aspect of the present disclosure relates to a motor vehicle comprising an assistance system according to the preceding aspect. The motor vehicle is in particular designed in a partially assisted manner.

The present disclosure also encompasses the combinations of the features of the described embodiments and examples.

BRIEF DESCRIPTION OF THE DRAWINGS

Exemplary embodiments of the present disclosure are described hereafter. In the drawings.

DETAILED DESCRIPTION

Figure 1:
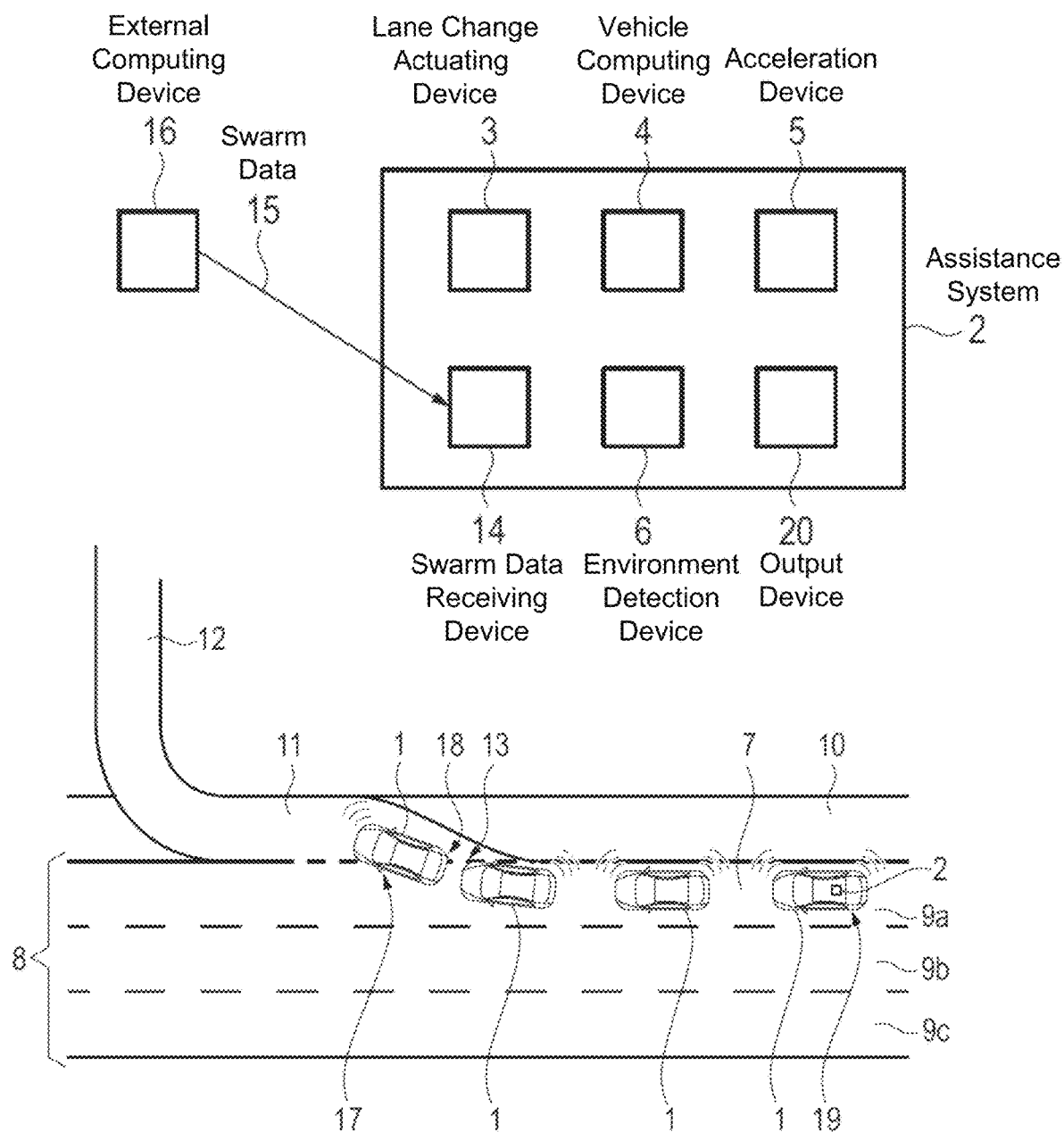
FIG. 1 shows a schematic top view onto one embodiment of a motor vehicle comprising one embodiment of an assistance system under some aspects of the present disclosure.

The exemplary embodiments described herein are preferred exemplary embodiments of the present disclosure. In the exemplary embodiments, the described components in each case represent individual features of the present disclosure which are to be considered independently of one another and which also refine the present disclosure independently of one another and, as a result, shall also be considered to be an integral part of the present disclosure, either individually or in a combination other than the one shown.

Furthermore, the described exemplary embodiments can also be supplemented with additional of the above-described features of the present disclosure.

In the figures, functionally equivalent elements are each denoted by the same reference numerals.

As described herein, in some examples, swarm data for the vehicle assistance system may be received from at least one further motor vehicle, which carried out a past lane change onto the deceleration lane at a crossing position serving as the swarm data between the driving lane and the deceleration lane, by means of a swarm data receiving device of the assistance system, and a change position for the lane change of the motor vehicle is determined as a function of the received crossing position, regardless of an actuating position of the motor vehicle during the driver input, by means of an electronic computing device of the assistance system, and the lane change is essentially carried out at the determined change position.

In this way, it is made possible for an improved lane change onto a deceleration lane of a roadway to be implemented. In particular, the roadway includes at least the driving lane on which the motor vehicle is presently situated. In some examples, the roadway furthermore includes a deceleration lane onto which the motor vehicle would like to change. The deceleration lane can already be situated next to the motor vehicle, or may also only be situated next to the motor vehicle in the future. By actuating the lane change actuating device, it is possible to signal to the assistance system that a future lane change onto the deceleration lane is desired. Based on the swarm data, and in particular based on the crossing position of the at least one further motor vehicle, the change position is now ascertained, at which the motor vehicle is able to cut into the deceleration lane.

In some examples, the swarm data may include historical data that occurred in the past and were generated, for example, based on a plurality of further motor vehicles. The crossing positions of a plurality of motor vehicles may thus be collected, at which these, in turn, traveled from the driving lane onto the deceleration lane. For example, based on the different crossing positions, a mean value can be found, which is determined as the change position.

The roadway may be a highway-like or a rural road-like roadway. For example, the roadway can include one driving lane or multiple driving lanes that extend parallel to one another. The roadway is in particular delimited by a solid line, for example in relation to a shoulder. The deceleration lane can then adjoin the shoulder. In particular, the solid line with respect to the shoulder may only be crossed during an emergency maneuver, and not during a lane change.

The lane change actuating device may be configured as a turn signal device of the motor vehicle, for example. In this way, the desired of the driver that a lane change is to be carried out may in particular already expressed prior to the actual lane change. The acceleration device can, in particular, be a longitudinal acceleration device and/or a transverse acceleration device. In the case of the transverse acceleration device, so-called steering maneuvers can be carried out, for example so as to alter the positions of the motor vehicle relative to a respective driving lane. The longitudinal acceleration device can be a braking device or an acceleration device.

A change position should be understood to mean that a lane change can preferably be carried out at the beginning of the deceleration lane. Depending on the environment, however, this point in time or this change position for the lane change can vary.

The assistance system according to the present disclosure differs from a lane change assistance system known from the prior art, in that the lane change is not immediately initiated by the actuation of the lane change actuating device, but that first the change position onto the deceleration lane is determined. Accordingly, "regardless of the actuating position" should be understood to mean that a future lane change onto the deceleration lane is desired, however that this is not to take place directly or in a direct chronological step thereafter, but that the assistance system is only notified that a future lane change onto the deceleration lane is desired, and that a lane change is desired as soon as the deceleration lane is negotiable.

A lane change, which is carried out at the change position, shall should be understood to mean that the motor vehicle preferably carries out the lane change in a predefined region around the change position.

In some examples, an environment of the motor vehicle is at least detected during the lane change by means of an environment detection device of the assistance system. For example, the assistance system can comprise a camera device and/or a LIDAR sensor device and/or a radar sensor device and/or an ultrasonic sensor device. The environment can then be reliably detected based on these detection devices. In this way, it is possible, for example, for the environment to be observed during the lane change and, for example, for appropriate maneuvers to be initiated so as to prevent a collision with further motor vehicles. Furthermore, it is possible to reliably detect the deceleration lane, for example, so that a lane change can be carried out.

When at least one further motor vehicle is detected in the environment, such as the deceleration lane, is taken into consideration during the determination of the change position. In the event that, for example, a further motor vehicle is already situated on the deceleration lane, the position, and in particular the speed, of this further motor vehicle can thus be taken into consideration, so that the lane change can be carried out safely. In the event that, for example, the deceleration lane also serves as an acceleration lane, in particular also as an on-ramp onto the roadway, the so-called following traffic which would like to change onto the roadway can thus likewise be taken into consideration, so that critical situations in road traffic can be prevented.

In some examples, a current speed of the motor vehicle and/or a deceleration potential of the motor vehicle and/or current weather conditions are taken into consideration during the determination of the change position. In particular, it is made possible in this way for an appropriate braking torque, for example, to be already determined in advance so as to achieve a final speed at the deceleration lane. For this purpose, the current speed is of importance, since it is possible in this way to determine the braking torque level that has to be applied. Furthermore, a deceleration potential, that is, the force with which the braking can be carried out, can also be taken into consideration, so that deceleration to a final speed at the deceleration lane is reliably possible. A maximum steering torque, for example, can likewise be taken into consideration to be able to reliably determine the change position. It is likewise possible to take weather conditions into consideration, for example whether the roadway or the deceleration lane is wet or covered with foliage, since in particular a lower braking torque then has to be applied to achieve the appropriate final speed at the end of the deceleration lane. In this way, it is possible to carry out a lane change onto the deceleration lane reliably and safely.

In some examples, an actuation of the lane change actuating device is proposed to the driver on an output device of the assistance system, as a function of a planned driving route of the motor vehicle. The motor vehicle can in particular, for example, comprise a navigation device for this purpose, in which a corresponding driving route is predefined. If the corresponding exit ramp is now to be used for reaching the destination, this can be displayed to the driver on the output device. The execution of the lane change maneuver can, in turn, be initiated by an actuation of the lane change actuating device. In this way, the driver of the motor vehicle can be guided in a highly convenient manner to his or her navigation destination.

A configuration of the deceleration lane—such as a shape of the deceleration lane and/or a predefined final speed when leaving the deceleration lane and/or a length of the deceleration lane and/or an additional embodiment of the deceleration lane as an acceleration lane—may also be taken into consideration during the determination of the change position. In this way, it is made possible that the configuration also advantageously exerts influence in terms of the location at which the change position is determined. In the event that the deceleration lane is very short, for example, it is provided in particular that the change position is determined at a very early stage. In the event that the deceleration lane is also designed as an acceleration lane, for example, a corresponding change position may not be determined until later since, in particular, the entering traffic also has to be considered. Furthermore, it can also be taken into consideration whether the deceleration lane is designed in a curve, or whether a corresponding sharp curve, with a speed limit, is present at the end of the deceleration lane. In this way, it is made possible that a safe lane change onto the deceleration lane can be implemented.

In some examples, a standard deviation of the swarm data with respect to the crossing position may be determined by means of the electronic computing device, and the determined standard deviation is processed during the determination of the change position. The standard deviation can preferably be determined on a motor vehicle-external electronic computing device. Based on the standard deviation, the change position can be reliably determined. In the event that, for example, the plurality of further motor vehicles changed at various crossing positions onto the deceleration lane, a "window" in which the change position may be situated can be determined based on the standard deviation. Based thereon, the change position can then, in turn, be reliably determined.

In some examples, an assisted positioning of the motor vehicle on the driving lane for the lane change is carried out chronologically before the lane change is carried out. If, for example, the motor vehicle is situated on the left of the driving lane, as viewed relative to the driving lane, a central positioning of the motor vehicle can be implemented prior to the actual lane change, so that an improved lane change can then, in turn, be carried out during the lane change. In this way, a large lateral distance can be prevented during the lane change to the deceleration lane. This in particular represents a target course shift to the driving lane center, even before the assisted lane change begins, as a preparatory step of the motor vehicle.

It should be understood that the processes and methods described herein are computer-based processes. Accordingly, aspects of the present disclosure relate to computers and computer program products comprising program code means, which prompt an electronic computing device (computer) to carry out a corresponding method when the program code means are being processed by the electronic computing device. Still another aspect thus also relates to a tangibly-embodied computer-readable memory medium comprising the computer program product.

Turning to FIG. 1, the drawing illustrates a schematic top view of a motor vehicle 1 comprising one embodiment of an assistance system 2. The assistance system 2 is shown in an enlarged view in the present example. The assistance system 2 comprises at least one acceleration device 5, such as a transverse acceleration device and/or a longitudinal acceleration device, an electronic computing device 4, a lane change actuating device 3 as well as at least one environment detection device 6 for detecting an environment 7 of the motor vehicle 1. The assistance system 2 furthermore comprises a swarm data receiving device 14. It may be provided in some examples that swarm data 15 can be received from a motor vehicle-external electronic computing device 16 by means of the swarm data receiving device 14.

Furthermore, it is illustrated that the motor vehicle 1, in the present example, is situated in different positions, this representing a chronological succession from right to left. The motor vehicle 1 is situated on a roadway 8 including three driving lanes 9a, 9b, 9c in the present example. The motor vehicle 1 is situated on a right driving lane 9a in the present example. Furthermore, a center driving lane 9b and a left driving lane 9c are shown. In the present example, the roadway 8 in particular furthermore includes a shoulder 10 as well as a deceleration lane 11. The deceleration lane 11 may form an extension of the shoulder 10 or follows the shoulder 10. In some examples, it is not permitted for the motor vehicle 1 to drive onto the shoulder 10, unless an emergency is involved. The deceleration lane 11, which, as mentioned above, forms the extension of the shoulder 10, is provided to reach a corresponding exit ramp 12 of the roadway 8. A lane change 13 onto the shoulder 10 is thus not allowed, but a lane change onto the deceleration lane 11 is.

FIG. 1 illustrates a method for carrying out the lane change 13 onto the deceleration lane 11 can be carried out by means of the assistance system 2. The lane change 13 may be carried out in an at least a partially assisted manner. As a function of a driver input on the lane change actuating device 3 of the assistance system 2, an intervention may be carried out in an at least partially assisted manner in the acceleration device 5 on the driving lane 9a, 9b, 9c of the roadway 8, and the lane change 13 from the driving lane 9a, 9b, 9c onto the deceleration lane 11 is carried out in an at least partially assisted manner.

In some examples, swarm data 15 are received from at least one further motor vehicle, which carried out a past lane change onto the deceleration lane 11, in particular in the past at a crossing position 17, serving as the swarm data 15 between the driving lane 9a, 9b, 9c and the deceleration lane 11, by means of the swarm data receiving device 14 of the assistance system 2, and a change position 18 for the lane change 13 of the motor vehicle 1 is determined as a function of the received crossing position 17, regardless of an actuating position 19 of the motor vehicle 1 during the driver input, by means of the electronic computing device 4 of the assistance system 2, and the lane change 13 is executed at the determined change position 18.

In some examples, the environment 7 of the motor vehicle 1 may be detected by means of the environment detection device 6 of the assistance system 2, at least during the lane change 13. For example, at least one detected still further motor vehicle in the environment 7, in particular on the deceleration lane 11, can be taken into consideration during the determination of the change position 13. Furthermore, it is in particular provided that a current speed of the motor vehicle 1 and/or a deceleration potential of the motor vehicle 1 and/or current weather conditions are taken into consideration during the determination of the change position 13.

Furthermore, it can be provided that an actuation of the lane change actuating device 3 is proposed to the driver on an output device 20 of the assistance system 2, as a function of a planned driving route of the motor vehicle 1.

Furthermore, it is provided that a configuration of the deceleration lane 11, such as a shape of the deceleration lane 11 and/or a predefined final speed when leaving the deceleration lane 11 and/or a length of the deceleration lane 11 and/or an additional embodiment of the deceleration lane 11 as an acceleration lane, is taken into consideration and processed during the determination of the change position 18. Furthermore, it is also possible to determine a standard deviation of the swarm data 15 with respect to the crossing position 17 by means of the electronic computing device 4, and to take the determined standard deviation into consideration during the determination of the change position 18.

Furthermore, an assisted positioning of the motor vehicle 1 on the driving lane 9a, 9b, 9c for the lane change 13 is carried out chronologically before the lane change 13 is carried out.

For example, FIG. 1 shows that the deceleration lane 11 is shown to be very short and provided with a strong curvature. The motor vehicle 1 may enter the corresponding exit ramp at a target speed, which is to be 40 km/h, for example, and the motor vehicle 1 is to carry out the lane change 13, for example, with a target speed of 80 km/h. As a result, the motor vehicle 1 has to be decelerated from 80 k/h to 40 km/h over the available length of the deceleration lane 11. The maximum deceleration of the assistance system 2, for example, only allows 3 m/s$^2$, so that it may be useful for the motor vehicle 1 to change onto the deceleration lane 11 sooner than, for example, the corresponding swarm data 15, that is, in particular sooner than the crossing position 17, so as to have a greater distance available there for reducing the speed.

Figure 2:
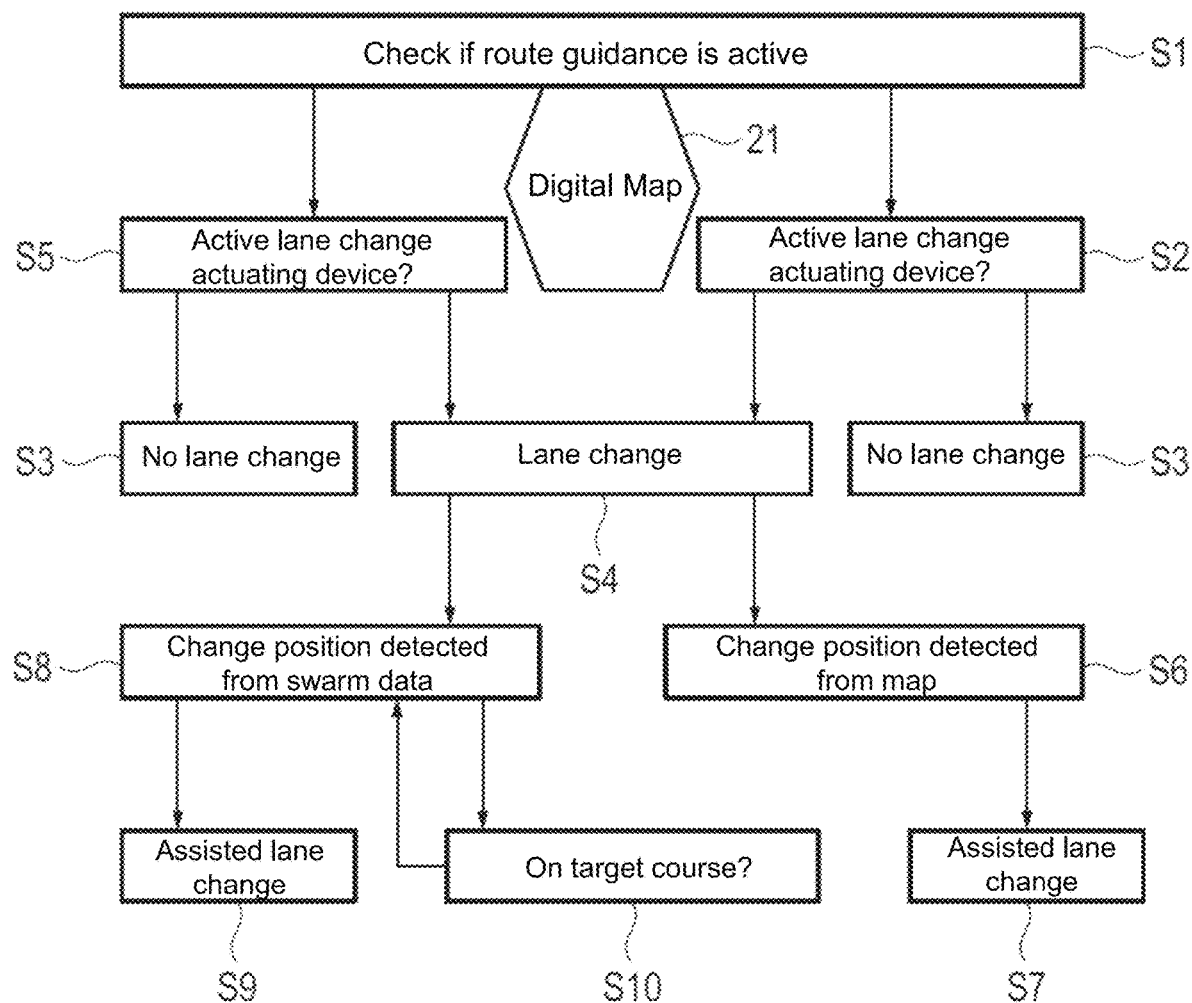
FIG. 2 shows a schematic flow chart of a method under some aspects of the present disclosure.

FIG. 2 shows a schematic flow chart according to one embodiment of a method according to the present disclosure. In a first step S1, it can be checked in the present example whether a route guidance of a navigation system is active, for example. For this purpose, a digital map 21 can likewise be provided. In the event that no route guidance is active, it is possible to check in a second step S2 whether the driver of the motor vehicle 1 has actuated the lane change actuating device 3 to the right, for example a turn signal device of the motor vehicle 1. If this is not the case, it can be assumed in a third step S3 that no lane change 13 is to be carried out, and the assistance system 2 can continue to be available for a driving lane change. If the corresponding exit ramp or the deceleration lane 11 is detected and the driver is situated on the right driving lane 9a, the described method for the lane change 13 onto the deceleration lane 11 can be carried out, which is illustrated in the present example by a fourth step S4.

If the route guidance is active, it can be proposed, proceeding from the first step S1, to the driver in a fifth step S5, for example, to utilize the future deceleration lane 11 based on the driving route, and it is possible to display here, for example on the output device 20, that the lane change actuating device 3 is to be actuated. If this is not the case, the assistance system 2 can, in turn, be available for a driving lane change on the roadway 8. If this is the case, it is possible, proceeding from the fifth step S5, to transition into the fourth step S4, that is, into the corresponding mode for the lane change 13 onto the deceleration lane 11. In the fourth step S4, it is then possible to check whether corresponding swarm data 15 are present. If this is not the case, it is possible to transition into a sixth step S6, wherein a corresponding lane change position can be determined, for example as a function of the digital map 1. In a seventh step S7, the lane change 13 can be carried out based on the digital map 21. If the swarm data 15 are available, it is possible, proceeding from the fourth step S4, to transition into an eight step S8. The change position 18 is determined based on the swarm data 15 or the crossing position 17. Additionally, it is also possible to resort to the digital map 21. Proceeding from the eighth step S8, it is then possible, in turn, to transition into a ninth step S9, which can carry out the assisted lane change 13 based on the swarm data 15. Furthermore, it is possible, proceeding from the eighth step S8, to transition into a tenth step S10, which further detects the environment 7, for example, and determines the change position 18, for example by recalculation based on the environment data.

In the tenth step S10, it is in particular additionally also possible to check whether the motor vehicle 1 on the right driving lane 9a is on a target course, or whether, for example, first a target course shift, that is, a repositioning of the motor vehicle 1 within the right driving lane 9a, is to be carried out before the actual lane change 13 is carried out.

In particular, it can furthermore be provided that the latest lane change 13 is limited, in particular in terms of time and location, to after the beginning of the deceleration lane 11. Furthermore, the latest lane change 13 can be limited in terms of time and location to before the end of the deceleration lane 11. Furthermore, the necessary deceleration on the deceleration lane 11 can be taken into consideration so as to negotiate a corresponding curve at the end of the deceleration lane 11 with a maximum defined transverse acceleration. Furthermore, the standard deviation of the swarm trajectory can additionally be assessed. Moreover, the surrounding, following motor vehicles can additionally be taken into consideration. Likewise, the surrounding entering motor vehicles can additionally be taken into consideration, in particular in the case of a combined on-ramp/exit ramp.

In the present embodiment, in particular right-hand traffic is to be assumed. In the event that, for example, left-hand traffic is present, the method is, in particular, to be adapted accordingly.

LIST OF REFERENCE NUMERALS

1 motor vehicle
2 assistance system
3 lane change actuating device
4 electronic computing device
5 acceleration device
6 environment detection device
7 environment
8 roadway
9a right driving lane
9b center driving lane
9c left driving lane
10 shoulder
11 deceleration lane
12 exit ramp
13 lane change
14 swarm data receiving device
15 swarm data
16 motor vehicle-external electronic computing device
17 crossing position
18 change position
19 actuating position
20 output device
21 digital map
S1 first step
S2 second step
S3 third step
S4 fourth step
S5 fifth step
S6 sixth step
S7 seventh step
S8 eighth step
S9 ninth step
S10 tenth step

The invention claimed is:

1. A method for executing a lane change from a driving lane onto a deceleration lane of a roadway, wherein the deceleration lane is configured to facilitate vehicle exit from the roadway, via an assistance system of a motor vehicle, the assistance system comprising a memory, a lane change actuating device, an electronic computing device, and a sensor system, comprising:
   receiving, via the lane change actuating device, a driver-initiated signal indicating a desired future lane change onto the deceleration lane;
   accessing, via the memory, or receiving, via a wireless communication apparatus operatively coupled to the assistance system, swarm data comprising data relating to at least one past lane change into the deceleration lane at a crossing position by at least one further motor vehicle;
   determining, via the electronic computing device, a change position for the lane change of the motor vehicle by processing the received or accessed swarm data, including the crossing position of the at least one further motor vehicle, in conjunction with dynamically updated data associated with the motor vehicle, including the current speed of the motor vehicle and environmental conditions wherein the change position is determined by the assistance system independently of the position of the motor vehicle at the time of the driver-initiated signal; and
   executing an at least partially assisted lane change using the driver assistance system according to the determined change position.

2. The method according to claim 1, further comprising:
   detecting, via the sensor system, a surrounding environment of the motor vehicle, wherein the sensor system detects motor vehicle movement and/or the presence of other vehicles on the deceleration lane; and
   processing the detected surrounding environment data, including the positions and speeds of detected other vehicles, in conjunction with the received or accessed swarm data, via the electronic computing device, to determine a permissible crossing position and adjust the lane change position according to the permissible crossing position.

3. The method according to claim 2, further comprising receiving, via the sensor system, motor vehicle movement detection data when determining the change position, wherein the movement detection data includes comprises information about positions and speeds of other vehicles on the deceleration lane.

4. The method according to claim 1, wherein determining the change position comprises processing, via the electronic computing device, one or more of a current speed of the motor vehicle, a deceleration capability of the motor vehicle, and/or current weather conditions.

5. The method according to claim 1, further comprising providing, via a display device of the assistance system, a lane change notification to a driver, wherein the notification is dynamically updated based on sensor data and swarm data, and is provided as part of an update to a planned driving route for the motor vehicle.

6. The method according to claim 1, wherein determining the change position comprises processing, via the electronic computing device, characteristics of the deceleration lane, comprising one or more of a shape of the deceleration lane, a recommended final speed when leaving the deceleration lane, a length of the deceleration lane, and/or a transition of the deceleration lane into an acceleration lane.

7. The method according to claim 1, further comprising calculating, via the electronic computing device, a standard deviation for the received or accessed swarm data with respect to the crossing position, and using the calculated standard deviation to define a range of permissible change positions during the determination of the change position to improve lane change accuracy.

8. The method according to claim 1, further comprising executing an assisted positioning of the motor vehicle within the driving lane in preparation for the lane change, wherein the assisted positioning in preparation for the lane change occurs via the assistance system prior to the execution of the lane change.

9. An assistance system of a motor vehicle for executing a lane change from a driving lane onto a deceleration lane of a roadway, wherein the deceleration lane is configured to facilitate vehicle exit from the roadway, the assistance system comprising:
- a lane change actuator for receiving a driver-initiated signal indicating a desired future lane change onto the deceleration lane;
- a swarm data receiving device comprising communication hardware configured to wirelessly receive data from other vehicles, the swarm data receiving device being configured to receive swarm data from at least one further motor vehicle, the swarm data comprising data relating to at least one past lane change into the deceleration lane at a crossing position by the at least one further motor vehicle;
- an electronic computing device configured to determine a change position for the lane change of the motor vehicle based on the received crossing position, wherein the change position is determined independently of the position of the motor vehicle at the time of the driver-initiated signal;
- wherein the assistance system is configured to execute the lane change according to the determined change position.

10. The assistance system according to claim 9, further comprising a sensor system of the assistance system for detecting a surrounding environment of the motor vehicle, wherein the sensor system detects motor vehicle movement on the deceleration lane at least during the execution of the lane change and correlates this data with the received swarm data.

11. The assistance system according to claim 10, wherein the electronic computing device is further configured to process motor vehicle movement detection data received from the sensor system when determining the change position.

12. The assistance system according to claim 9, wherein the electronic computing device is configured to determine the change position by processing one or more of a current speed of the motor vehicle, a deceleration potential capability of the motor vehicle, and/or current weather conditions.

13. The assistance system according to claim 9, further comprising an output device configured to communicate a lane change notification to the driver, wherein the notification is dynamically updated based on sensor data and swarm data, and is provided as part of an update to a planned driving route for the motor vehicle.

14. The assistance system according to claim 9, wherein the electronic computing device is configured to determine the change position by processing characteristics of the deceleration lane, including one or more of a shape of the deceleration lane, a recommended final speed when leaving the deceleration lane, a length of the deceleration lane, and/or a transition of the deceleration lane into an acceleration lane.

15. The assistance system according to claim 9, wherein the electronic computing device is configured to calculate a standard deviation for the received swarm data with respect to the crossing position, and to process the calculated standard deviation during the determination of the change position to enhance the accuracy of the lane change decision.

16. The assistance system according to claim 9, wherein the electronic computing device is configured to execute an assisted positioning of the motor vehicle in the driving lane in preparation for the lane change, wherein the assisted positioning occurs prior to the execution of the lane change.

17. A computer program product comprising executable program code, which, when executed by a computing device of a driver assistance system, causes the driver assistance system to:
- receive, via a lane change actuating device of the driver assistance system, a driver-initiated signal indicating a desired future lane change onto a deceleration lane of a roadway, wherein the deceleration lane is configured to facilitate vehicle exit from the roadway;
- access, via a memory of the driver assistance system, or receive, via a wireless communication apparatus operatively coupled to the assistance system, swarm data comprising data relating to at least one past lane change into the deceleration lane at a crossing position by at least one further motor vehicle;
- determine, via the computing device, a change position for the lane change of the motor vehicle by processing the received or accessed swarm data, including the crossing position of the at least one further motor vehicle, in conjunction with dynamically updated data associated with the motor vehicle, including a current speed of the motor vehicle and environmental conditions, wherein the change position is determined by the assistance system independently of a position of the motor vehicle at the time of the driver-initiated signal; and
- execute an at least partially assisted lane change using the driver assistance system according to the determined change position.

18. The computer program product according to claim 17, wherein the executable program code is further configured to:
- detect a surrounding environment of the motor vehicle using a sensor system coupled to the driver assistance system, wherein the sensor system detects motor vehicle movement on the deceleration lane at least during the execution of the lane change and correlates the detected movement data with the received or accessed swarm data;
- receive motor vehicle movement detection data from the sensor system; and
- process the motor vehicle movement detection data when determining the change position.

19. The computer program product according to claim 17, wherein determining the change position comprises:
- processing one or more of a current speed of the motor vehicle, a deceleration capability of the motor vehicle, and/or current weather conditions; or
- processing characteristics of the deceleration lane, including one or more of a shape of the deceleration lane, a recommended final speed when leaving the deceleration lane, a length of the deceleration lane, and/or a transition of the deceleration lane into an acceleration lane.

20. The computer program product according to claim 17, wherein the executable program code is further configured to:
- calculate a a standard deviation for the received or accessed swarm data with respect to the crossing position; and
- process the calculated standard deviation during the determination of the change position to improve the accuracy of the lane change decision.

* * * * *